(12) United States Patent
Park et al.

(10) Patent No.: US 9,294,172 B2
(45) Date of Patent: Mar. 22, 2016

(54) METHOD AND APPARATUS FOR REPORTING DOWNLINK CHANNEL STATE

(71) Applicant: LG ELECTRONICS INC., Seoul (KR)

(72) Inventors: Hanjun Park, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/162,560

(22) Filed: Jan. 23, 2014

(65) Prior Publication Data

US 2014/0211873 A1 Jul. 31, 2014

Related U.S. Application Data

(60) Provisional application No. 61/756,471, filed on Jan. 25, 2013, provisional application No. 61/759,323, filed on Jan. 31, 2013.

(51) Int. Cl.
*H04L 27/00* (2006.01)
*H04B 7/04* (2006.01)
*H04B 7/06* (2006.01)

(52) U.S. Cl.
CPC ............ *H04B 7/0456* (2013.01); *H04B 7/0617* (2013.01); *H04B 7/0619* (2013.01)

(58) Field of Classification Search
CPC .................................................... H04B 7/0456
USPC .......................................................... 375/259
See application file for complete search history.

(56) References Cited

U.S. PATENT DOCUMENTS

| | | | |
|---|---|---|---|
| 8,320,488 B2 * | 11/2012 | Lee et al. | 375/267 |
| 2006/0270360 A1 * | 11/2006 | Han et al. | 455/69 |
| 2008/0292012 A1 * | 11/2008 | Kim et al. | 375/260 |
| 2010/0104033 A1 * | 4/2010 | Gorokhov | 375/260 |
| 2010/0111211 A1 * | 5/2010 | Han et al. | 375/260 |
| 2011/0142147 A1 * | 6/2011 | Chen et al. | 375/260 |
| 2012/0207240 A1 * | 8/2012 | Chen et al. | 375/285 |
| 2012/0218913 A1 * | 8/2012 | Park et al. | 370/252 |
| 2013/0136062 A1 * | 5/2013 | Gorokhov | 370/328 |
| 2013/0336152 A1 * | 12/2013 | Zhu et al. | 370/252 |
| 2014/0119278 A1 * | 5/2014 | Balraj et al. | 370/328 |

* cited by examiner

*Primary Examiner* — Santiago Garcia
(74) *Attorney, Agent, or Firm* — Birch, Stewart, Kolasch & Birch, LLP

(57) ABSTRACT

A method of reporting a channel state to a base station supporting downlink multiple input multiple output (MIMO) in a wireless communication system includes measuring a downlink channel based on a downlink signal received from the base station, and reporting a codebook index for precoding of the downlink signal according to the measurement of the downlink channel. In the case in which the UE receives channel state information (CSI)-reference signal (RS) resources for $N_1$ antenna ports, if a report for $N_2$ ($N_1 > N_2$) antenna ports is set, a codebook for the $N_2$ antenna ports is configured as a subset of a codebook for the $N_1$ antenna ports configured by the base station. Information about the $N_2$ antenna ports is received from the base station.

8 Claims, 8 Drawing Sheets

FIG. 5
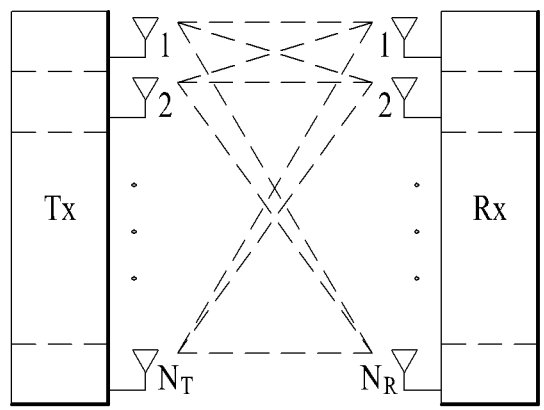
(a)
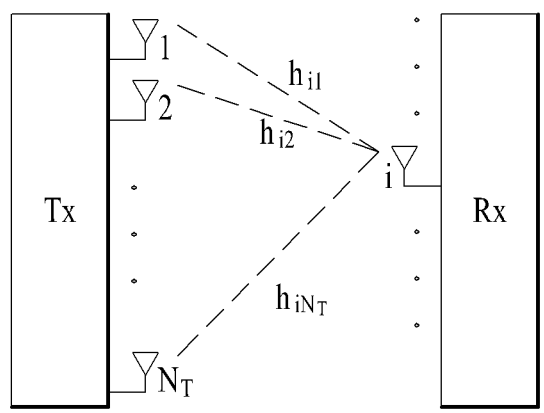
(b)

FIG. 6
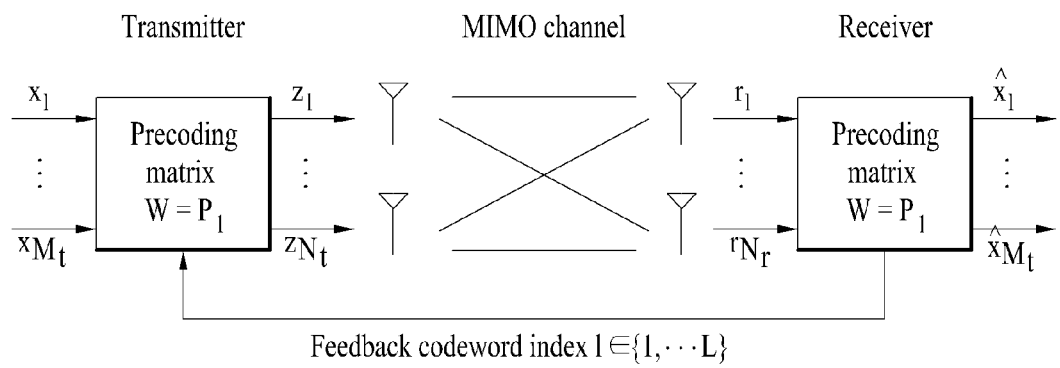
FIG. 7
(a)
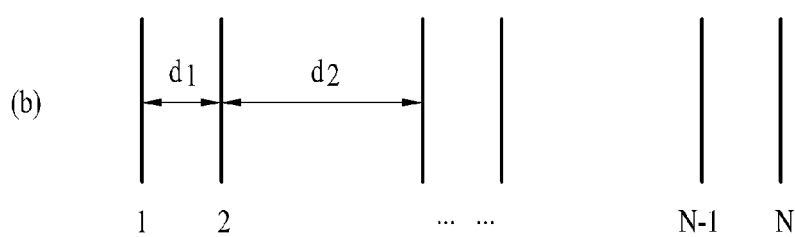
(b)
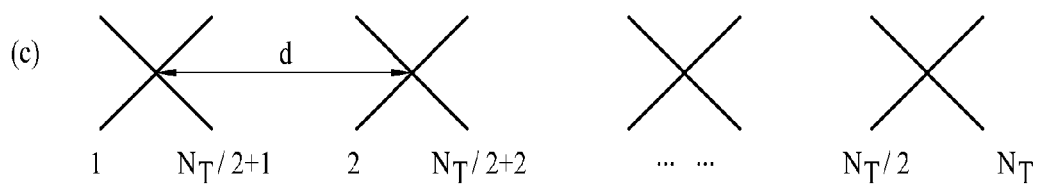
(c)

FIG. 8
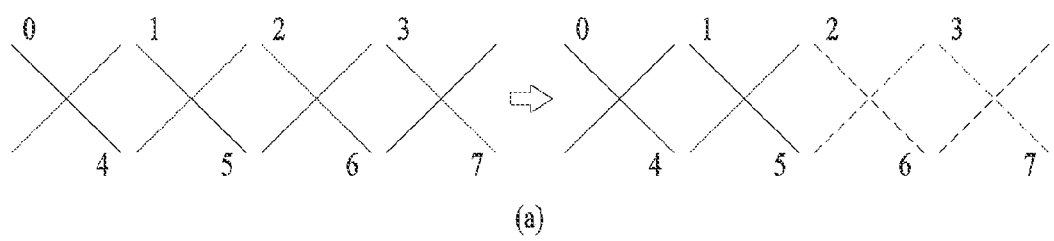
(a)
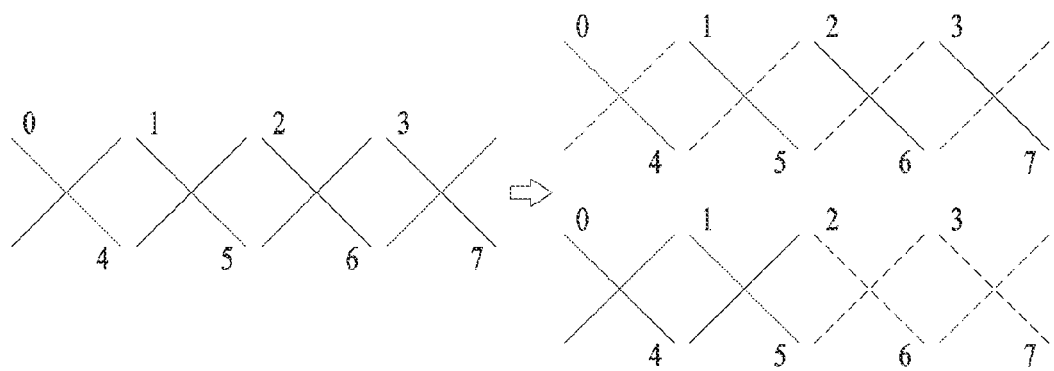
(b)
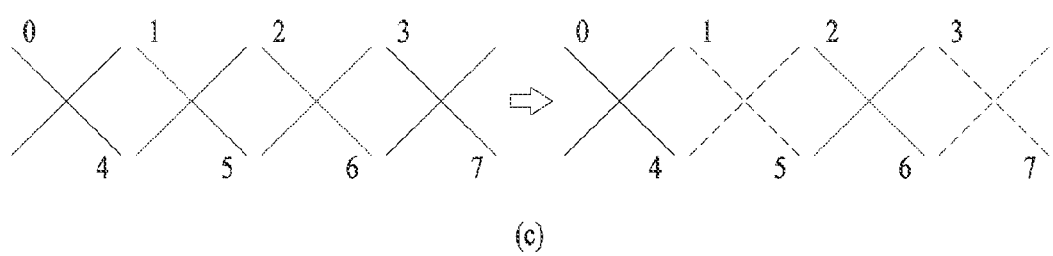
(c)

METHOD AND APPARATUS FOR REPORTING DOWNLINK CHANNEL STATE

Pursuant to 35 U.S.C. §119(e), this application claims the benefit of U.S. Provisional Applications Nos. 61/756,471 filed on Jan. 25, 2013 and 61/759,323 filed on Jan. 31, 2013, which are hereby incorporated by reference as if fully set forth herein.

BACKGROUND OF THE INVENTION

1. Field of the Invention

The present invention relates to a wireless communication system, and more particularly, to a method and apparatus for reporting a downlink channel state.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for reporting a downlink channel state that substantially obviates one or more problems due to limitations and disadvantages of the related art.

An object of the present invention is to provide a method for efficiently receiving a wireless signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reporting a channel state to a base station supporting downlink multiple input multiple output (MIMO) in a wireless communication system includes measuring a downlink channel based on a downlink signal received from the base station and reporting a codebook index for precoding of the downlink signal according to the measurement of the downlink channel. In the case in which the UE receives channel state information (CSI)-reference signal (RS) resources for $N_1$ antenna ports, if a report for $N_2$ ($N_1 > N_2$) antenna ports is set, a codebook for the $N_2$ antenna ports is configured as a subset of a codebook for the $N_1$ antenna ports configured by the base station, and information about the $N_2$ antenna ports is received from the base station.

In another aspect of the present invention, a user equipment (UE) configured to report a channel state to a base station supporting downlink multiple input multiple output (MIMO) in a wireless communication system including a radio frequency (RF) unit and processor configured to control the RF unit. The processor is configured to measure a downlink channel based on a downlink signal received from the base station and to report a codebook index for precoding of the downlink signal according to the measurement of the downlink channel. In the case in which the UE receives channel state information (CSI)-reference signal (RS) resources for $N_1$ antenna ports, if a report for $N_2$ ($N_1>N_2$) antenna ports is set, the processor configures a codebook for the $N_2$ antenna ports as a subset of a codebook for the $N_1$ antenna ports configured by the base station, and information about the $N_2$ antenna ports is received from the base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a block diagram showing a multi-input multi-output (MIMO) used in a 3GPP LTE/LTE-A system;

FIG. 6 is a diagram illustrating codebook based beamforming;

FIG. 7 is a diagram showing the configuration of 8 transmit (Tx) antennas;

FIG. 8 is a diagram showing the configuration of antennas;

DETAILED DESCRIPTION OF THE INVENTION

Figure 1:
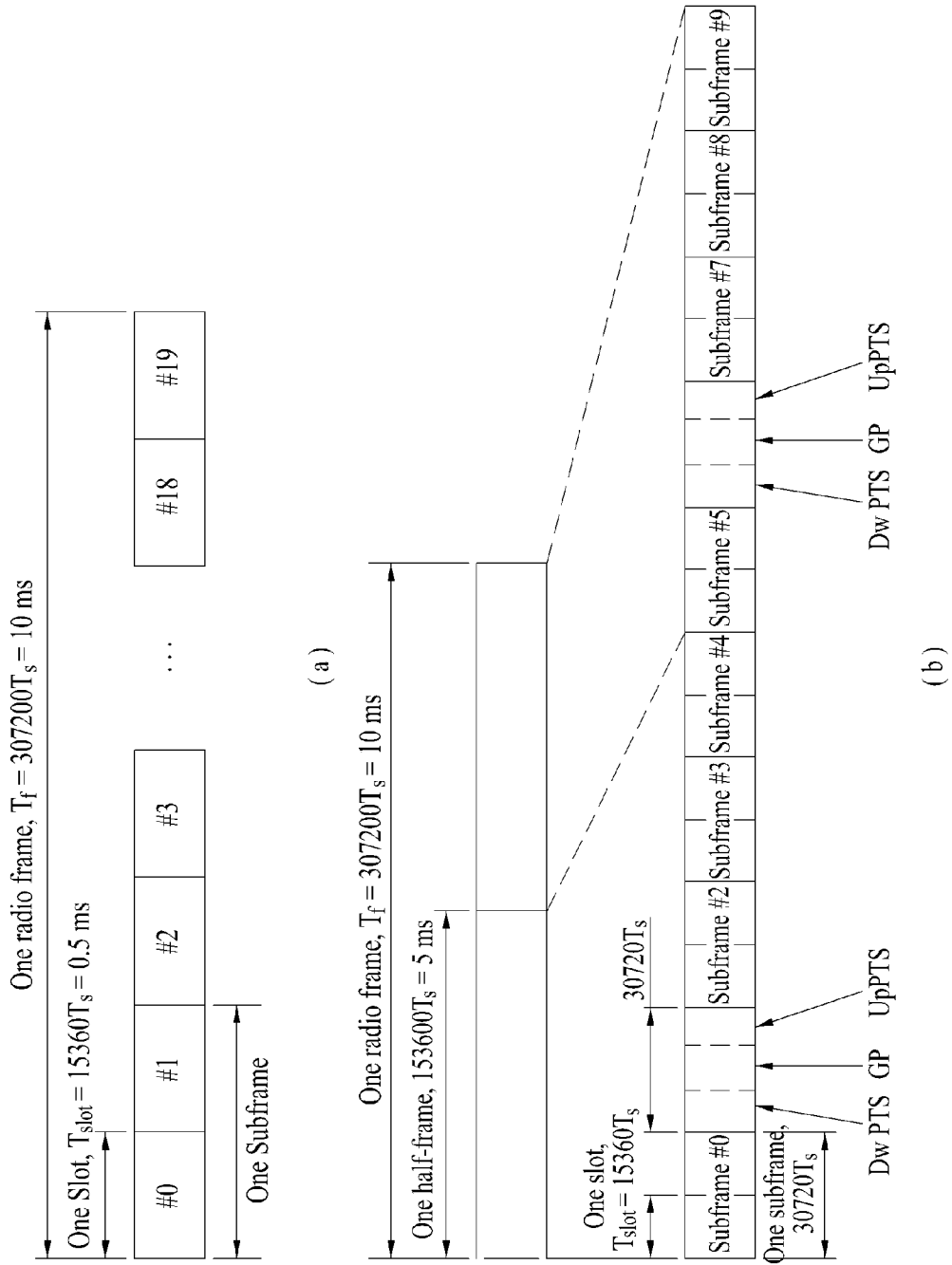
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Downlink-to-Uplink | | Subframe number | | | | | | | | | |
|---|---|---|---|---|---|---|---|---|---|---|---|
| DL-UL configuration | Switch-point periodicity | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
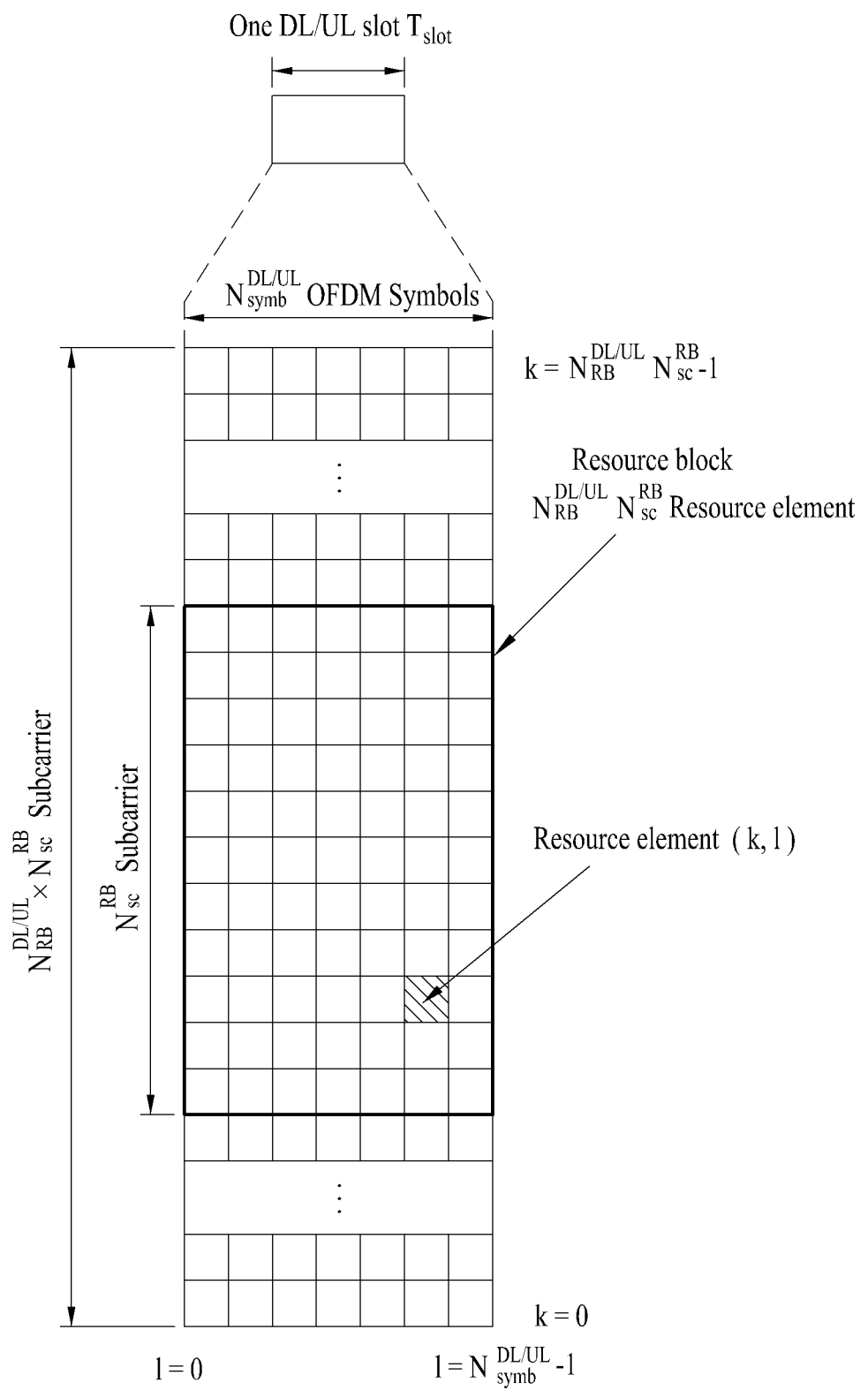
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{RB}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
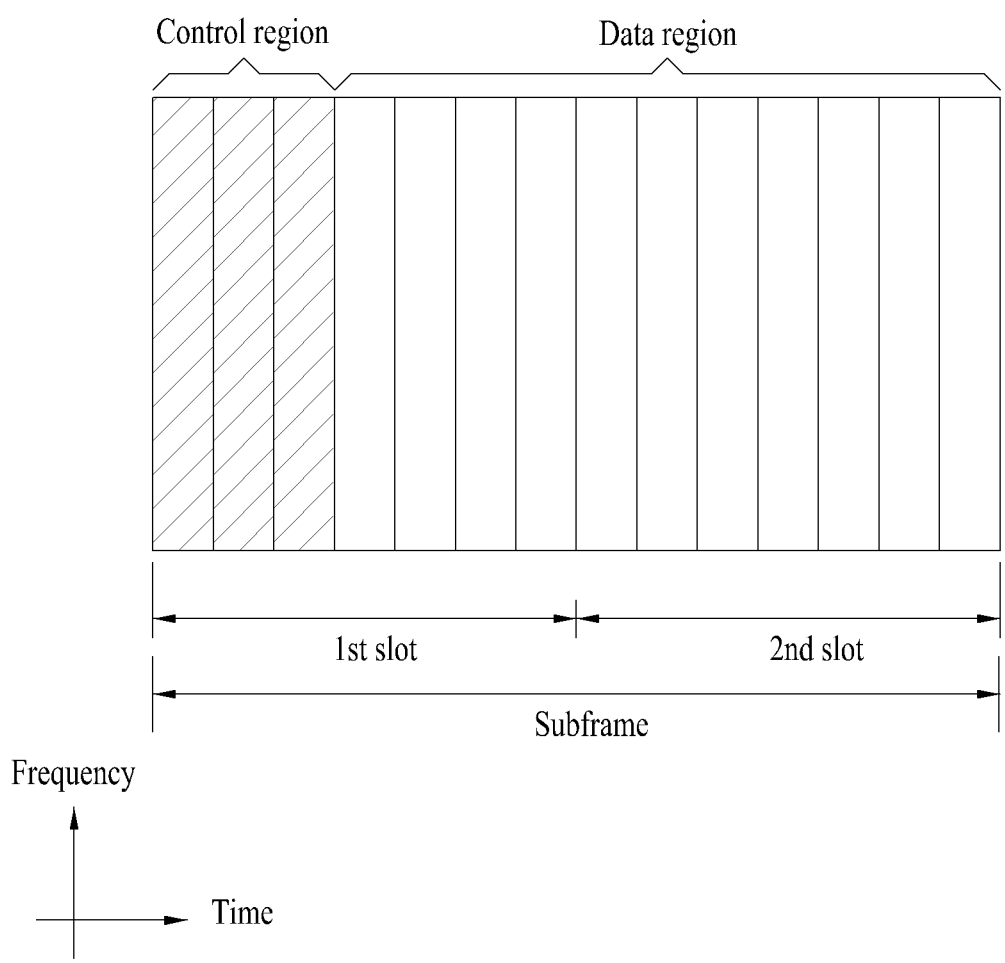
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared channel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
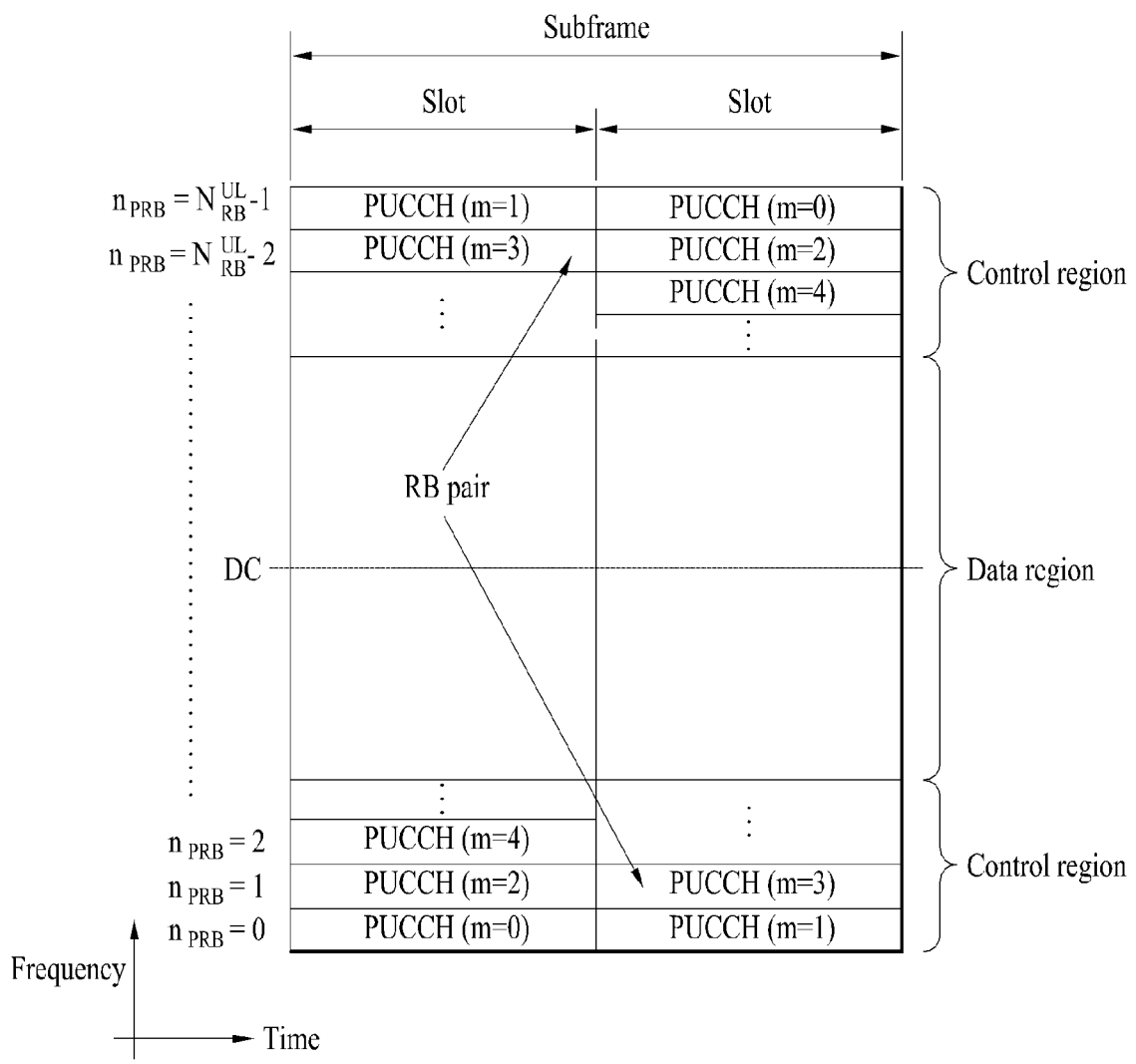
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $W_{ij}$ denotes a weight between an i-th Tx antenna and j-th information. W is also called a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T 1} \\ h_{12} & h_{12} & \cdots & h_{2N_T 1} \\ \vdots & & \ddots & \\ h_{i2} & h_{i2} & \cdots & h_{iN_T 1} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with Additive white Gaussian noise (AWGN). The AWGN $n_1, n_2, \ldots, n_{N_R}$ added to the NR Rx antennas is given as the following vector.

$$n = [n_1, n_2, \ldots n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T 1} \\ h_{12} & h_{12} & \cdots & h_{2N_T 1} \\ \vdots & & \ddots & \\ h_{i2} & h_{i2} & \cdots & h_{iN_T 1} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \quad \text{[Equation 11]}$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Codebook Based Precoding Scheme

A precoding scheme for appropriately distributing transmission information according to the channel states of antennas is applicable in order to support MIMO transmission. A codebook based precoding scheme refers to a scheme for predetermining a set of precoding matrices between a transmitter and a receiver, measuring channel information from the transmitter at the receiver, feeding a suitable precoding matrix (that is, a precoding matrix index (PMI)) back to the transmitter and applying the suitable precoding matrix to signal transmission at the transmitter. Since a suitable precoding matrix is selected from the predetermined set of precoding matrices, an optimal precoding matrix may not always be applied but feedback overhead can be reduced as compared to explicit feedback of optimal precoding information in actual channel information.

FIG. 6 is a diagram illustrating the basic concept of codebook based precoding.

In a codebook based precoding scheme, a transmitter and a receiver share codebook information including a predetermined number of precoding matrices predetermined according to transmission rank, number of antennas, etc. That is, if feedback information is finite, a precoding based codebook scheme may be used. The receiver may measure a channel state via a received signal and feed a finite number of pieces of preferred precoding matrix information (that is, the indices of the precoding matrices) back to the transmitter based on the above-described codebook information. For example, the receiver may measure the received signal using a maximum likelihood (ML) or minimum mean square error (MMSE) method and select an optimal precoding matrix. Although FIG. 6 shows the case in which the receiver transmits precoding matrix information on a per codeword basis, the present invention is not limited thereto.

The transmitter, which has received feedback information from the receiver, may select a specific precoding matrix from the codebook based on the received information. The transmitter, which has selected the precoding matrix, may perform precoding by multiplying layer signals corresponding in number to transmission rank by the selected precoding matrix and transmit the precoded signal via a plurality of antennas. In the precoding matrix, the number of rows is equal to the number of antennas and the number of columns is equal to the rank value. Since the rank value is equal to the number of layers, the number of columns is equal to the number of layers. For example, if the number of transmit antennas is 4 and the number of transmit layers is 2, a 4×2 precoding matrix may be configured. Information transmitted via the layers may be mapped to the antennas via the precoding matrix.

The receiver, which has received the signal precoded and transmitted by the transmitter, may perform an inverse process of precoding performed by the transmitter to restore a received signal. In general, the precoding matrix satisfies a unitary matrix (U) condition such as $U*U^H=I$ and the inverse process of precoding may be performed by multiplying a Hermitian matrix ($P^H$) of the precoding matrix P used for precoding of the transmitter by the received signal.

For example, Table 4 below shows a codebook used for downlink transmission using 2 transmit antennas in 3GPP LTE release-8/9 and Table 5 below shows a codebook used for downlink transmission using 4 transmit antennas in 3GPP LTE release-8/9.

TABLE 4

| Codebook index | Number of rank 1 | Number of rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers v = 1 | v = 2 | v = 3 | v = 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5 above, $W_n^{\{s\}}$ is obtained by a set $\{s\}$ composed of an equation $W_n = I - 2u_n u_n^H / u_n^H u_n$. At this time, I denotes a 4×4 unitary matrix and $u_n$ denotes a value given in Table 5.

As shown in Table 4 above, a codebook for 2 transmit antennas has a total of 7 precoding vectors/matrices. Since a unitary matrix is for an open-loop system, the total number of precoding vectors/matrices for precoding of a closed-loop system is 6. In addition, a codebook for 4 transmit antennas shown in Table 5 above has a total of 64 precoding vectors/matrices.

Such a codebook has common properties such as a constant modulus (CM) property, a nested property and a constrained alphabet property. The CM property means that elements of all precoding matrices in the codebook do not include "0" and have the same size. The nested property means that a precoding matrix having a low rank is designed to be composed of a subset of specific columns of a precoding matrix having a high rank. The constrained alphabet property means that the elements of all the precoding matrices in the codebook are constrained. For example, the elements of the precoding matrix may be constrained to only an element±1 used for binary phase shift keying (BPSK), an element±1,±j used for quadrature phase shift keying (QPSK) or an element $$\pm 1, \pm j, \pm \frac{(1+j)}{\sqrt{2}}, \pm \frac{(-1+j)}{\sqrt{2}}$$

used for 8-PSK. The example of the codebook of Table 5 above may have the constrained alphabet property since the letters of the elements of all the precoding matrices in the codebook are composed of $$\left\{ \pm 1, \pm j, \pm \frac{(1+j)}{\sqrt{2}}, \pm \frac{(-1+j)}{\sqrt{2}} \right\}.$$

Multi-Antenna Configuration

FIG. 7 is a diagram showing the configuration of 8 transmit (Tx) antennas.

FIG. 7(a) shows the case in which N antennas configure independent channels without grouping, which is generally referred to as a uniform linear array (ULA). If the number of antennas is small, such a ULA may be used. However, if the number of antennas is large, a space of a transmitter and/or a receiver may be insufficient when a plurality of antennas is arranged to be separated from each other to configure independent channels.

FIG. 7(b) shows a paired ULA in which two antennas forms a pair. In this case, an associated channel is present between the paired antennas and different pairs of antennas may have independent channels.

In legacy 3GPP LTE Release-8/9, four transmit antennas are used in downlink. However, after a 3GPP LTE Release-10 system, 8 transmit antennas may be used in downlink. In order to apply an extended antenna configuration, several transmit antennas should be mounted in a small space. Thus, the ULAs shown in FIGS. 7(a) and 7(b) are not suitable. Accordingly, as shown in FIG. 7(c), a dual-pole (or cross-pole or cross polarization structure) antenna configuration may be applied. If such a transmit antenna configuration is used, although a distance d between antennas is relatively short, antenna correlation may be low to configure independent channels. Therefore, high data transmission throughput can be obtained.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc.

Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 6 below.

TABLE 6

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 6, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 7 below shows the mode of the UE when the CQI, the PMI and the RI are transmitted via the PUSCH.

TABLE 7

| | | PMI feedback type | | |
|---|---|---|---|---|
| | | No PMI | Single PMI | Multiple PMIs |
| PUSCH CQI feedback type | Wideband (wideband CQI) | | | Mode 1-2 |
| | UE selection (subband CQI) | Mode 2-0 | | Mode 2-2 |
| | Higher layer | Mode 3-0 | Mode 3-1 | |

TABLE 7-continued

| | PMI feedback type | | |
|---|---|---|---|
| | No PMI | Single PMI | Multiple PMIs |
| configuration (subband CQI) | | | |

The transmission mode of Table 7 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 8 below.

TABLE 8

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 8. Referring to Table 8, in Mode 2-0 and Mode 2-1, a bandwidth (BP) part is a set of subbands continuously located in a frequency domain and may cover a system bandwidth or a specified set S. In Table 8, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.
  i) Type 1: A subband CQI (SB-CQI) of Mode 2-0 and Mode 2-1 is transmitted.
  ii) Type 2: A wideband CQI and a PMI (WB-CQI/PMI) are transmitted.
  iii) Type 3: An RI is transmitted.
  iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 8, the transmission periodicity of the wideband CQI/PMI and the subband CQI is P and has the following properties.
  The wideband CQI/PMI has periodicity of H*P. At this time, H=J*K+1, wherein J denotes the number of BPs and K denotes the number of periodicities of the BP. That is, the UE performs transmission at {0, H, 2H, ...}.
  The CQI is transmitted at a time of J*K rather than when the wideband CQI/PMI is transmitted.

In Table 8, the transmission periodicity of the RI is a multiple m of that of the wideband CQI/PMI and has the following properties.
  The offsets of the RI and the wideband CQI/PMI are 0 and, if the RI and the wideband CQI/PMI are transmitted in the same subframe, the wideband CQI/PMI is not transmitted.

Parameters P, H, K and O described in Table 8 are all determined at the higher layer of the UE and signaled to a physical layer of the UE.

Hereinafter, a feedback operation according to the mode of the UE will be described with reference to Table 8. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rd-10.

Each BS may transmit a CSI-RS for channel measurement to the UE via a plurality of antenna ports and each UE may calculate channel state information based on the CSI-RS and transmit the channel state information to each BS in response thereto.

CoMP (Coordinated Multiple Point Transmission and Reception) Operation

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

In an advanced wireless communication system such as 3GPP LTE-A, a multi-user MIMO scheme is supported in order to obtain multi-user gain. In MU-MIMO, an interference channel is present between UEs multiplexed in a spatial domain, accuracy of a feedback channel of the UE influences not only performance of the UE which performs feedback but also interference in the multiplexed UE and thus higher accuracy is required from the viewpoint of channel feedback. In a 3GPP LTE-A system, in order to increase feedback channel accuracy, a final precoding matrix indicator (PMI) is designed to be divided into $W^{(1)}$ having a long-term and wideband property and $W^{(2)}$ having a short-term and subband property.

At this time, as an example of a method of determining a final PMI, hierarchical codebook transformation such as W=norm (W$^{(1)}$W$^{(2)}$) may be performed using two pieces of channel information. Here, norm(A) means normalization for enabling a norm value of each column of a matrix A to become 1.

For example, an 8Tx codebook for eight transmit antennas defined in a 3GPP LTE-A system is designed as a codebook having a dual structure from the viewpoint of the above-described hierarchical codebook design and may be expressed by the following equation.

$$W^{(1)}(i) = \begin{bmatrix} X_i & 0 \\ 0 & X_i \end{bmatrix},$$ [Equation 12]

where $X_i$ is $Nt/2$ by $M$ matrix.

$$W^{(2)}(j) = \overbrace{\begin{bmatrix} e_M^k & e_M^l & & e_M^m \\ \alpha_j e_M^k & \beta_j e_M^l & \cdots & \gamma_j e_M^m \end{bmatrix}}^{r \text{ columns}}$$

(if rank = $r$), where $1 \le k, l, m \le M$ and $k, l, m$ are integer.

where, W$^{(1)}$(i) and W$^{(2)}$(j) denote matrices for i-th and j-th codewords in codeword sets for W$^{(1)}$ and W$^{(2)}$, respectively. In general, in an antenna, antenna elements are located on the same line in the form of a uniform linear array (ULA) and, at this time, a constant interval proportional to a wavelength is maintained between two adjacent antenna elements. Alternatively, an antenna having a cross polarization property may be configured using a wave polarization property. That is, an antenna element having a vertical polarization property and an antenna element having a horizontal polarization property may be located at the same position and thus spatial efficiency is excellent when an antenna array is physically configured.

In a 3GPP LTE-A system, when the 8Tx codebook is designed, the cross polarization antenna is used and, when an interval between the antennas is small, that is, when the distance between the adjacent antennas is equal to or less than half a signal wavelength, a relative phase difference between channels is applied. The cross polarization antenna may be divided into an antenna group having a horizontal polarization property and an antenna group having a vertical polarization property. Each antenna group has a ULA antenna property and the antenna elements of the two antenna groups are located at the same positions. In general, when a channel is modeled in terms of a line of sight (LOS), the same linear phase difference is present between antenna channels in each group having the vertical or horizontal polarization property and only the phase differ between the antenna channel groups having different polarization properties. At this time, since the codebook is expressed by quantizing the channel, the property of the channel may be maximally applied to design the codebook. For example, in case of a rank 1 codeword, for example, such a channel property is applied to a codeword satisfying the following equation.

$$W^{(1)}(i) * W^{(2)}(j) = \begin{bmatrix} X_i(k) \\ \alpha_j X_i(k) \end{bmatrix}$$ [Equation 13]

In the above-described equation, the codeword is expressed by a vector of $N_t \times 1$ and $N_t$ denotes the number of transmit antenna ports. In addition, a high-level vector $X_i(k)$ and a low-level vector $\alpha_j X_i(k)$ are included and indicate an antenna group having a horizontal polarization property and an antenna group having a vertical polarization property, respectively. $X_i(k)$ is expressed by a vector having a linear phase difference property between the antennas of each antenna group. As a representative example thereof, a discrete Fourier transform (DFT) matrix may be used. In addition, $\alpha_j$ denotes a phase difference between antenna groups having different polarization properties.

Meanwhile, recently, in a system after 3GPP LTE Rel-12, even in the case of having four transmit antennas, a more sophisticated codebook needs to be designed for improvement of MU-MIMO performance, and an improved 4Tx codebook has been discussed. At this time, the reason why MU-MIMO performance of the legacy 4Tx codebook can be improved is because a cross polarization property was not applied when the 4Tx codebook is designed in LTE Rel-8. In contrast, in case of an 8Tx codebook designed in Rel-10, the cross polarization property is applied and thus the 8Tx codebook structure needs to be maximally reused to improve the 4Tx codebook. A method of, at an eNB, configuring a channel state information (CSI) feedback structure using the 8Tx codebook with respect to the UE and disallowing channel information of four antenna ports among 8Tx antenna ports to be used such that the 8Tx codebook is reused for feedback for the 4Tx antenna ports may be considered.

From this viewpoint, the present invention proposes a method of partially utilizing a codebook for $N_1$ antenna ports as an additional codebook for $N_2$ antenna ports when codebooks for $N_1$ and $N_2$ ($<N_1$) antenna ports are respectively present.

As detailed operations of the present invention, a method of sharing information about the $N_2$ antenna ports selected from among the $N_1$ antenna ports between the eNB and the UE, a method of indicating whether feedback for $N_1$ antenna ports or feedback for $N_2$ antenna ports is performed, a method of defining a plurality of candidate groups for $N_2$ antenna ports when feedback for $N_2$ antenna ports is performed and indicating information regarding which candidate group is applied to the UE, a method of implicitly informing the UE of information about $N_2$ antenna ports via a relationship between CSI-RS resources and CSI-IM resources or ZP CSI-RS resources without signal transmission of the eNB and a method of utilizing $N_1$-$N_2$ antenna ports which are not used for feedback will be described.

First Embodiment

For $N_2$ Antenna Ports, Feedback Based on Codebook for $N_1$ Antenna Ports ($N_1 > N_2$) and Configuration Thereof According to the detailed embodiment of the present invention, when codebooks for $N_1$ and $N_2$ ($<N_1$) antenna ports are respectively present and when the UE receives feedback based on a codebook for the $N_1$ antenna ports, utilizes only channel values for the $N_2$ antenna ports and utilizes the codebook for the $N_1$ antenna ports as an additional codebook for the $N_2$ antenna ports, a method of predefining information about ports used as the $N_2$ antenna ports among the $N_1$ antenna ports at the eNB and the UE will be described. In an LTE-A system, the case of $N_1$=8, $N_2$=4, that is, the case in which the 8Tx codebook is used for the 4Tx antenna, is assumed. Here, as an example of the detailed operation of the present invention, as shown in FIG. 8(a), when indices for the 8Tx antenna ports are set to antenna ports (0, 1, . . . , 7), antenna ports (0, 1, 4, 5) are predefined such that the UE performs CSI feedback using only the antenna ports. At this time, the UE may perform CSI feedback using only CSI-RS resources corresponding to (0, 1, 4, 5). For example, with respect to 8 channel elements for 8 antenna ports which may be estimated at an arbitrary receive antenna, the channel may be estimated using CSI-RS resources with respect to antenna ports (0, 1, 4, 5) predefined between the eNB and the UE and the channel value may be set to 0 without a separate estimation process and then CSI feedback based on the 8Tx codebook may be performed with respect to antenna ports (2, 3, 6, 7). In FIG. 8(a), the antennas denoted by dotted lines mean antenna ports which are not actually used. That is, precoding codewords for $N_2$ antenna ports are configured as $N_2$ elements of precoding codewords for $N_1$ antenna ports.

At this time, the predefined antenna ports may not be a single configuration but may be composed of a plurality of candidate groups. For example, in the above example, two candidate groups including antenna ports (0, 1, 2, 3) considering the eNB which has the co-polarization 4Tx antenna ports and antenna ports (0, 1, 4, 5) considering the eNB which has cross polarization 4Tx antenna ports may be predefined as shown in FIG. 8(b). FIG. 8 is only exemplary and different combinations of antenna ports may be predefined.

According to the detailed embodiment of the present invention, when codebooks for $N_1$ and $N_2$ ($<N_1$) antenna ports are respectively present and when the UE receives feedback based on the codebook for the $N_1$ antenna ports, utilizes only channel values for $N_2$ antenna ports and utilizes the codebook for the $N_1$ antenna ports as an additional codebook for the $N_2$ antenna ports, a method of transmitting information about the ports used as the $N_2$ antenna ports among the $N_1$ antenna ports from the eNB to the UE will be described. According to the detailed embodiment of the present invention, in an LTE-A system, the case of $N_1=8$, $N_2=4$, that is, the case in which the 8Tx codebook is used for the 4Tx antenna is assumed. Here, as the detailed operation of the present invention, as shown in FIG. 8(a), when indices for the 8Tx antenna ports are set to (0, 1, . . . , 7), a method of, at the eNB, informing the UE as to whether each antenna port is used via a semi-static signal such as RRC is considered. For example, if the eNB has the co-polarization 4Tx antennas, the eNB informs the UE that antenna ports (0, 1, 2, 3) are used for 4Tx feedback via an RRC signal. In contrast, if the eNB has cross polarization 4Tx antennas, the eNB informs the UE that antenna ports (0, 1, 4, 5) are used for 4Tx feedback via an RRC signal. In the operation of the present invention, as compared to the method of predefining the 4Tx antenna ports, various antenna ports can be selected. For example, as shown in FIG. 8(c), antenna ports (0, 2, 4, 6) may be selected.

At this time, the 4Tx antenna ports signaled from the eNB to the UE via a higher layer signal such as an RRC signal may not be a single configuration but may be composed of a plurality of candidate groups. For example, in the above example, the UE may be informed of two candidate groups including antenna ports (0, 1, 2, 3) considering the eNB which has the co-polarization 4Tx antenna ports and antenna ports (0, 1, 4, 5) considering the eNB which has cross polarization 4Tx antenna ports via the RRC signal.

In 3GPP LTE(-A), for CSI estimation of the eNB or the transmission point, a CSI process is defined and the CSI process includes CSI-interference measurement (IM) for interference measurement and CSI-reference signal (RS) for channel estimation. At this time, information regarding which of the $N_1$ antenna ports is selected as the $N_2$ antenna ports may be set with respect to an individual CSI process or a CSI process set.

Additionally, according to the detailed embodiment of the present invention, a method of indicating whether the UE performs feedback for the $N_1$ antenna ports or feedback for the $N_2$ antenna ports in a semi-static or dynamic manner will be described. According to the detailed embodiment of the present invention, in an LTE-A system, the case of $N_1=8$, $N_2=4$, that is, the case in which the 8Tx codebook is used for the 4Tx antenna is assumed. When the eNB supporting 4Tx antenna ports wishes to use an improved codebook, the UE may perform feedback for 4Tx antenna ports defined by a higher layer signal such as an RRC signal or predefined via semi-static signal transmission such as RRC. In addition, when dynamic point selection (DPS) between a transmission point $(TP)_1$ having eight antenna ports and a $TP_2$ having four antenna ports is supported in an environment in which the UE performs MU-MIMO with UEs before Rel-10, that is, UEs supporting only 4Tx antenna port based transmission mode of the eNB or a CoMP scheme is applied, fast scheduling may be supported via dynamic signal transmission such as DCI indicating whether feedback for 8Tx antenna ports is performed or feedback for 4Tx antenna ports is performed according to the operation of the present invention. At this time, information regarding whether feedback for the $N_1$ antenna ports is performed or feedback for the $N_2$ antenna ports is performed may be set with respect to an individual CSI process or a CSI process set.

According to the detailed embodiment of the present invention, a method of informing the UE as to which of a plurality of candidate groups for the $N_2$ antenna ports is applied in a semi-static or dynamic manner will be described. According to the embodiment of the present invention, in an LTE-A system, the case of N1=8, N2=4, that is, the case in which the 8Tx codebook is used for the 4Tx antenna is assumed. At this time, according to the present invention, when a plurality of candidate groups is defined with respect to the 4Tx antenna ports, the UE may be informed of one candidate group. For example, two candidate groups including a first candidate considering the co-polarization 4Tx antenna ports, that is, antenna ports (0, 1, 2, 3), and a second candidate considering the cross polarization 4Tx antenna ports, that is, antenna ports (0, 1, 4, 5), may be predefined and, if the eNB supports the co-polarization 4Tx, the UE may be informed of the antenna ports (0, 1, 2, 3) configuration between the two candidates via a higher layer signal such as an RRC signal. Alternatively, when two TPs (e.g., $TP_1$ and $TP_2$) supporting 4Tx antenna ports respectively have the co-polarization property and the cross polarization property, the antenna ports (0, 1, 2, 3) are used when the UE receives service from the TP1 and the antenna ports (0, 1, 4, 5) are used when the UE receives service from the $TP_2$ according to the dynamic signal such as DCI for the candidate group, thereby supporting suitable feedback according to DPS operation. At this time, information regarding which of a plurality of candidate groups for the $N_2$ antenna ports is applied may be set with respect to an individual CSI process or a CSI process set.

Additionally, according to the embodiment of the present invention, a method of informing a UE of information about ports used as the $N_2$ antenna ports among the $N_1$ antenna ports via a relationship between CSI-RS resources and CSI-IM or ZP CSI-RS resources will be described. According to the detailed embodiment of the present invention, in an LTE-A system, the case of N1=8, N2=4, that is, the case in which the 8Tx codebook is used for the 4Tx antenna is assumed. In an LTE-A system, in order to perform feedback using the 8Tx codebook, a CSI process including 8Tx CSI-RS should be configured with respect to the UE. At this time, the 8Tx CSI-RS resources may be roughly divided into two 4Tx CSI- RS resources and CSI-IM or ZP CSI-RS resources are allocated in units of 4Tx CSI-RS resources. Using these features, the present invention proposes a method in which, when a specific UE is allocated 8Tx CSI-RS resources and is also allocated CSI-M or ZP CSI-RS with respect to 4Tx CSI-RS resources corresponding to a subset of the CSI-RS resources, the UE does not perform CSI-RS based channel estimation with respect to the overlapping 4Tx CSI-RS resources and performs 8Tx codebook based feedback using only the other non-overlapping 4Tx CSI-RS resources. For example, the UE may assume that the channel value corresponding to the overlapping 4Tx CSI-RS resources is 0 and perform feedback using the channel estimated with respect to the 4Tx CSI-RS resources as compared to the 8Tx codebook.

Additionally, according to the detailed embodiment of the present invention, a method of indicating whether data transmission is performed with respect to CSI-RS resources corresponding to ($N_1$-$N_2$) antenna ports excluding the $N_2$ antenna ports among the $N_1$ antenna ports will be described. According to the embodiment of the present invention, in an LTE-A system, the case of $N_1$=8, $N_2$=4, that is, the case in which the 8Tx codebook is used for the 4Tx antenna is assumed. If the 8Tx codebook is reused for 4Tx feedback according to the embodiment of the present invention, a possibility that the CSI-RS resources are transmitted according to 4Tx is high. However, in a process of configuring a CSI process, in order to use the 8Tx codebook, a CSI-RS configuration corresponding to 8Tx should be performed and, at this time, the UE transmits the CSI-RS resources in a resource region using one of 8Tx CSI-RS patterns. Here, according to the detailed operation of the present invention, even when the CSI feedback structure using the 8Tx codebook is used, if an instruction to use only the 4Tx antenna ports is received from the eNB, UE operation on the assumption that data transmission is performed in the resource region excluding the CSI-RS resources corresponding to the 4Tx antenna ports indicated by the eNB is proposed. At this time, the eNB may indicate information about the CSI-RS resources using which data transmission is not performed, that is, 4Tx CSI-RS is transmitted and rate matching is performed.

According to the embodiment of the present invention, a method of, at an eNB, indicating a signal for utilizing the codebook for the $N_1$ antenna ports will be described. According to the detailed embodiment of the present invention, in an LTE-A system, the case of $N_1$=8, $N_2$=4, that is, the case in which the 8Tx codebook is used for the 4Tx antenna is assumed. In an LTE system according to the embodiment of the present invention, when the UE receives 4Tx CSI-RS resources, the UE use the codebook for 4Tx antenna ports. With respect to the above operation, the present invention proposes a method for performing feedback for 4Tx antenna ports based on the 8Tx codebook using information about a relationship between the 4Tx antenna ports and 8Tx antenna ports for the 8Tx codebook pre-signaled from the eNB via a higher layer signal or predefined according to the operation of the present invention if an instruction to utilize the 8Tx codebook is received from the eNB, even when the UE receives 4Tx CSI-RS resources. In other words, this may be an instruction to perform feedback using a codebook for a specific antenna port according to one embodiment of the present invention or signaling for activating the operation of the above-described embodiment.

Second Embodiment

CSI-RS Resource Sharing Per CSI Process

In an LTE Rel-12 system, use of an additional 4Tx codebook for improving MU-MIMO performance in addition to the 8Tx codebook with respect to the DM-RS based transmission mode is proposed. As described above, if the 4Tx codebook optimized for MU-MIMO performance is introduced, a specific UE more preferably performs a new 4Tx codebook based MU-MIMO operation optimized for MU-MIMO rather than performing the 8Tx codebook based MU-MIMO operation. In the above environment, the UE needs to simultaneously perform the 8Tx codebook based CSI feedback and the new 4Tx codebook based CSI feedback with respect to the same transmission point. Accordingly, the eNB may configure two CSI processes defined for the same transmission point with respect to the UE and configure the CSI processes to have 8-port CSI-RS resources and 4-port CSI-RS resources. The present invention proposes a method of sharing CSI-RS resources between the CSI processes in order to efficiently use the CSI-RS resources in the above environment. This is applicable to a legacy codebook in addition to the new 4Tx codebook.

As an additional operation according to the embodiment of the present invention, when the eNB configures a plurality of CSI processes with respect to the UE, a method of, at the eNB, configuring the CSI processes to partially share the CSI-RS resources between the CSI processes will be described. In an LTE system according to the embodiment of the present invention, when a CSI process having 8-port CSI-RS resources and a CSI process having 4-port CSI-RS resources are present with respect to the same transmission point, the CSI processes are preferably configured such that the 4-port CSI-RS resources are included as a subset of the 8-port CSI-RS resources, for efficient use of the CSI-RS resources. At this time, the 4-port CSI-RS resources may become a subset of the S-port CSI-RS resources defined in time, frequency and space. More specifically, when the S-port CSI-RS resources are transmitted with a specific transmission period, the 4-port CSI-RS resources may have a period which is a multiple of the specific transmission period and may have resources included in the 4-port CSI-RS pattern among the 8-port CSI-RS patterns expressed by FDM (frequency division multiplexing) and CDM (code division multiplexing). At this time, the CSI-RSs shared between the plurality of CSI processes configured with respect to the UE have the same scrambling sequence. In addition, as proposed by the above example, when different CSI processes share CSI-RS resources, the CSI-RS resources belonging to one CSI process do not necessarily need to be a subset of the CSI-RS resources belonging to the other CSI process and only CSI-RS resources for some antenna ports may be shared.

As an additional operation according to the embodiment of the present invention, when the eNB configures CSI processes such that the CSI-RS resources are partially shared between the CSI processes, a method of, at the eNB, informing the UE as to whether the CSI-RS resources are partially shared between the CSI processes and of information about the shared resources will be described. In an LTE system according to the embodiment of the present invention, when a CSI process having 8-port CSI-RS resources and a CSI process having 4-port CSI-RS resources are present with respect to the same transmission point and the 4-port CSI-RS resources are included as a subset of the S-port CSI RS resources according to the operation of the present invention, the eNB may inform the UE that the 4-port CSI-RS resources are a subset of the 8-port CSI-RS resources via a higher layer signal such as an RRC signal. At this time, the UE may share channel information estimated per CSI process based on the above information so as to more efficiently perform the CSI feedback process. When the Rel-10 codebook for 4Tx is advantageous than the new 4Tx codebook in terms of transmission load and thus may be continuously used in Rel-12, the above information is used when the eNB instructs the UE not to use the Rel-10 4Tx codebook with respect to the 4Tx codebook but to use the new 4Tx codebook.

Third Embodiment

Application to Heterogeneous/Non-Heterogeneous Cell Environment

In an LTE Rel-12 system, in a heterogeneous cell environment in which a macro cell and a pico cell coexist, a method of selecting some antennas of the macro cell and performing feedback for the antennas in order to reduce interference of the macro cell with the pico cell is proposed. At this time, the UE should simultaneously perform feedback for all antenna ports and feedback for some antenna ports selected in order to reduce interference. For example, the eNB supporting eight antenna ports may instruct the UE to perform feedback for four antenna ports selected in order to reduce interference and feedback for 8 antenna ports. In the above environment, the eNB should configure 8-port non-zero power (NZP) CSI-RS resources and 4-port NZP CSI-RS resources with respect to the UE. At this time, 8-port NZP CSI-RS resources and 4-port NZP CSI-RS resources are used to perform feedback for different environments (e.g., homogeneous cell or heterogeneous cell environment) with respect to the same transmission point and thus NZP CSI-RS resources may be repeatedly used in terms of resource management. For example, the 4-port NZP CSI-RS resources may be configured as a subset of the 8-port NZP CSI-RS resources.

In LTE Rel-11, whether some resources are shared between NZP CSI-RS resources is not explicitly described and thus, in the present invention, a method of sharing some resources between NZP CSI-RS resources will be described.

As another operation according to the embodiment of the present invention, when the eNB configures a plurality of NZP CSI RS resources with respect to the UE, a method of sharing some CSI-RS resources between NZP CSI-RS resources will be described. In an LTE system, when 8-port NZP CSI-RS resources and 4-port NZP CSI-RS resources for the same transmission point are configured with respect to the UE, for efficient use of the CSI-RS resources, the 4-port NZP CSI-RS resources are preferably configured to be included as a subset of the 8-port NZP CSI-RS resources. At this time, the 4-port CSI-RS resources may become a subset of the 8-port CSI-RS resources defined in time, frequency or space. More specifically, when the 8-port NZP CSI-RS resources are transmitted with a specific transmission period, the 4-port NZP CSI-RS resources have a period which is a multiple of the specific transmission period and may be defined as resources corresponding to four antenna ports among the 8-port NZP CSI-RS patterns expressed by FDM (frequency division multiplexing) and CDM (code division multiplexing). At this time, the CSI-RSs shared between the plurality of NZP CSI-RSs configured with respect to the UE have the same scrambling sequence. In addition, as proposed by the above example, when different NZP CSI-RS resources share some CSI-RS resources, the CSI-RS resources belonging to one NZP CSI-RS resource do not necessarily need to be a subset of the CSI-RS resources belonging to the other NZP CSI-RS resources and only CSI-RS resources for some antenna ports may be shared.

As an additional operation according to the embodiment of the present invention, when the eNB configures a plurality of NZP CSI resources with respect to the UE and when the eNB configures the CSI-RS resources shared between the NZP CSI-RS resources, a method of, at the eNB, informing the UE as to whether the CSI-RS resources are partially shared between the NZP CSI-RSs and of information about the shared CSI-RS resources will be described. In an LTE system, when 8-port NZP CSI-RS resources and 4-port NP CSI-RS resources for the same transmission point are configured with respect to the UE and when the 4-port NZP CSI-RS resources are included as a subset of the 8-port NZP CSI-RS resources according to the operation of the present invention, the eNB may inform the UE that the 4-port NZP CSI-RS resources are a subset of the 8-port NZP CSI-RS resources via a higher layer signal such as an RRC signal. At this time, the UE may share channel estimation information for the shared 4-port NZP CSI-RS resources based on the above information so as to more efficiently perform the CSI feedback process. That is, the channel estimation information of the 4-port NZP CSI-RS resources may be used as channel estimation information for the four antenna ports among the 8-port NZP CSI-RSs. In addition, since the 4-port NZP CSI-RSs are for antenna ports according to the antenna selection process for reducing interference in the heterogeneous cell environment, the 4-port NZP CSI-RS resource pattern may not be used. Accordingly, the eNB should inform the UE of information indicating which resources of the 8-port NZP CSI-RS resource pattern configure the 4-port NZP CSI-RS resources.

Figure 9:
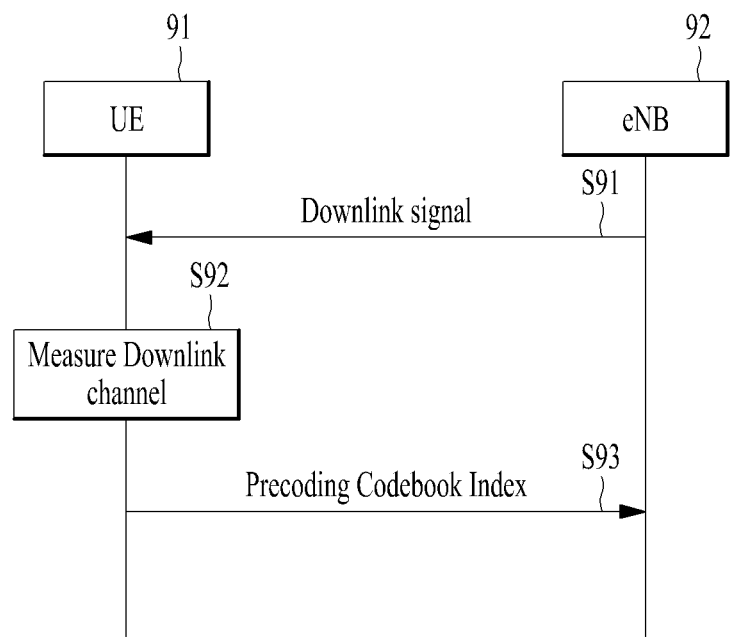
FIG. 9 is a diagram showing a procedure of an embodiment of the present invention.

FIG. 9 shows operation according to one embodiment of the present invention. A UE 91 receives a downlink signal from an eNB 92 (S91). The downlink signal may be codebook based precoded as described above. For codebook based precoding, refer to the above description.

The UE may measure a downlink channel based on the downlink signal (S92). Channel state information, which may be composed of an RI, a PMI and a CQI, may be reported to the eNB via downlink channel measurement (S93). In the present embodiment, only the PMI of the CSI is considered.

In one embodiment of the present invention, the UE may receive channel state information (CSI)-reference signal (RS) resources for $N_1$ antenna ports from the eNB or the system. In this state, if a report for $N_2$ ($N_1 > N_2$) antenna ports is set, a codebook for the $N_2$ antenna ports is configured as a subset of a codebook for $N_1$ antenna port configured by the eNB. Such a configuration is possible even when the codebook for the $N_2$ antenna ports is present. The UE may receive information about the $N_2$ antenna ports from the eNB.

Figure 10:
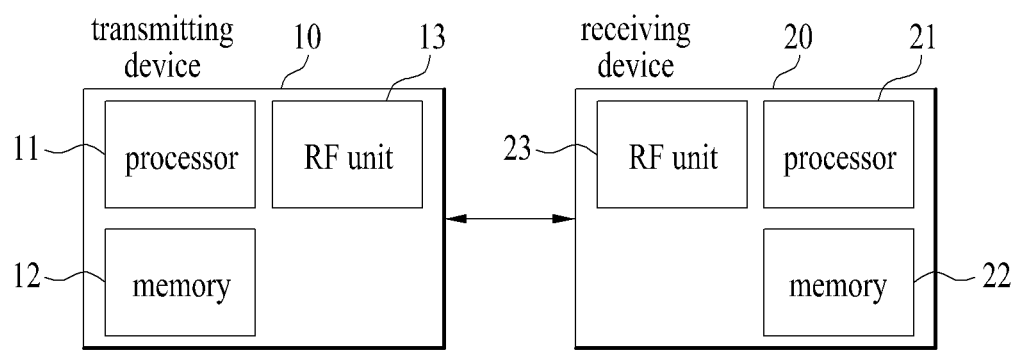
FIG. 10 is a block diagram of an apparatus for implementing embodiment(s) of the present invention.

FIG. 10 shows only some of the above-described embodiments of the present invention and the UE or the eNB may implement a combination of at least some of the embodiments of the present invention.

FIG. 10 is a block diagram showing components of a transmitter 10 and a receiver 20 for performing the embodiments of the present invention. The transmitter 10 and the receiver 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitter 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiver 20 is the inverse of signal processing of the transmitter 10. Under control the processor 21, the RF unit 23 of the receiver 20 receives a radio signal transmitted by the transmitter 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitter 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiver 20. A reference signal (RS) transmitted in correspondence with the antenna defines the antenna viewed from the viewpoint of the receiver 20 and enables the receiver 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitter 10 in uplink and operates as the receiver 20 in downlink. In the embodiments of the present invention, an eNB operates as the receiver 20 in uplink and as the transmitter 10 in downlink.

The transmitter and/or the receiver may perform a combination of at least one or two embodiments among the above-described embodiments of the present invention.

Although the embodiments of the present invention are described as a receiver operating in uplink, the embodiments of the present invention are applicable to a receiver operating in downlink.

According to one embodiment of the present invention, it is possible to efficiently receive a downlink wireless signal.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be used for a wireless communication apparatus such as a user equipment (UE), a relay and a base station (BS).

What is claimed is:

1. A method of reporting a channel state to a base station supporting downlink multiple input multiple output (MIMO) in a wireless communication system, the method performed by a user equipment (UE) configured with channel state information reference signal (CSI-RS) resources for $N_1$ antenna ports and comprising:

receiving, from the base station, a report configuration for $N_2$ ($N_2 < N_1$) antenna ports and information about the $N_2$ antenna ports;

receiving, from the base station, information regarding whether data is transmitted in remaining CSI-RS resources corresponding to antenna ports excluding the $N_2$ antenna ports among the $N_1$ antenna ports;

measuring a downlink channel in CSI-RS resources for $N_2$ antenna ports using the report configuration, the information about the $N_2$ antenna ports and the information regarding whether data is transmitted in the remaining CSI-RS resources; and reporting, to the base station, a codebook index for precoding of the downlink signal according to the measurement of the downlink channel, wherein the codebook index indicates $N_2$ elements of codewords for the $N_1$ antenna ports as codewords for the $N_2$ antenna ports, and wherein the information about the $N_2$ antenna ports indicates the $N_2$ antenna ports selected from the $N_1$ antenna ports.

2. The method according to claim 1, wherein the information about the $N_2$ antenna ports is indicated by a set composed of a plurality of candidate antenna ports.

3. The method according to claim 1, wherein the information about the $N_2$ antenna ports is configured for each CSI process or each CSI process set.

4. The method according to claim 1, wherein the information about the $N_2$ antenna ports is indicated by the CSI-RS resources from which overlapping resources are excluded,
wherein the overlapping resources are overlapped between the CSI-RS resources and CSI-interference measurement (CSI-IM) resources or zero-power (ZP) CSI-RS resources configured to the UE.

5. The method according to claim 1, further comprising, if the UE is served by two or more base stations, receiving indication information regarding whether a report for the $N_1$ antenna ports or a report for the $N_2$ antenna ports is required from the base station.

6. The method according to claim 5, wherein the indication information is configured for each CSI process or each CSI process set.

7. The method according to claim 1, further comprising receiving a configuration for codewords for the $N_2$ antenna ports from the base station.

8. A user equipment (UE) configured to report a channel state to a base station supporting downlink multiple input multiple output (MIMO) in a wireless communication system, the UE configured with channel state information reference signal (CSI-RS) resources for $N_1$ antenna ports and comprising:
 a radio frequency (RF) unit; and
 a processor configured to control the RF unit,
 wherein the processor is further configured to:
 receive, from the base station, a report configuration for $N_2$ antenna ports and information about the $N_2$ antenna ports,
 receive, from the base station, information regarding whether data is transmitted in remaining CSI-RS resources corresponding to antenna ports excluding the $N_2$ antenna ports among the $N_1$ antenna ports,
 measure a downlink channel in CSI-RS resources for $N_2$ antenna ports using the report configuration, the information about the $N_2$ antenna ports and the information regarding whether data is transmitted in the remaining CSI-RS resources, and
 report, to the base station, a codebook index for precoding of the downlink signal according to the measurement of the downlink channel,
 wherein the codebook index indicates $N_2$ elements of codewords for the $N_1$ antenna ports to report codewords for the $N_2$ antenna ports, and
 wherein the information about the $N_2$ antenna ports indicates the $N_2$ antenna ports selected from the $N_1$ antenna ports.

* * * * *